July 10, 1951     C. S. BATCHELOR ET AL     2,559,748
APPARATUS FOR BONDING BRAKE LININGS TO BRAKE SHOES
Filed Sept. 24, 1949     3 Sheets-Sheet 1
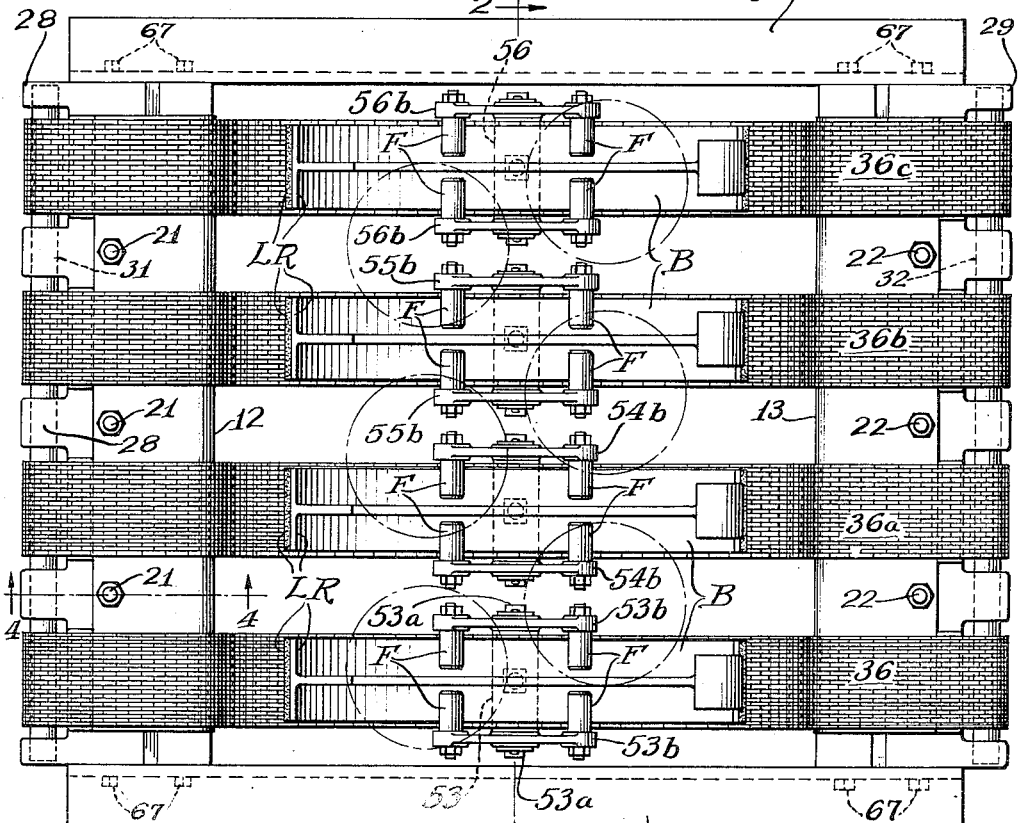
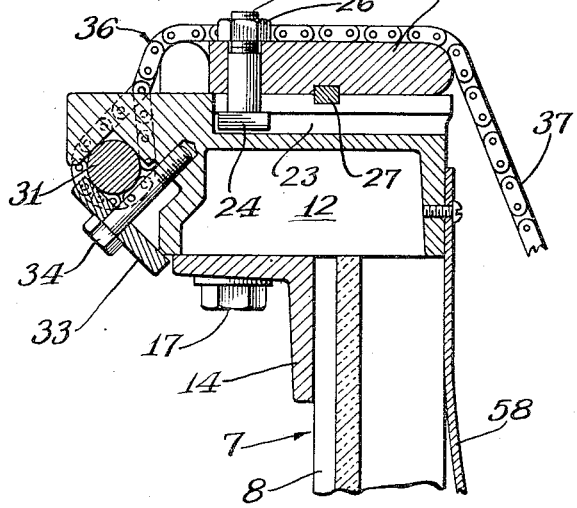
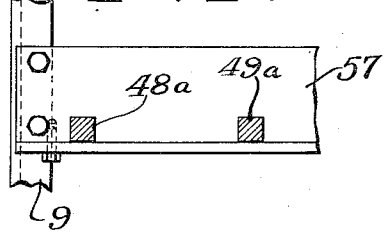
Inventors:
Clyde S. Batchelor
Edward L. Carey
By Lee J. Gary Atty.

July 10, 1951 C. S. BATCHELOR ET AL 2,559,748
APPARATUS FOR BONDING BRAKE LININGS TO BRAKE SHOES
Filed Sept. 24, 1949 3 Sheets-Sheet 2
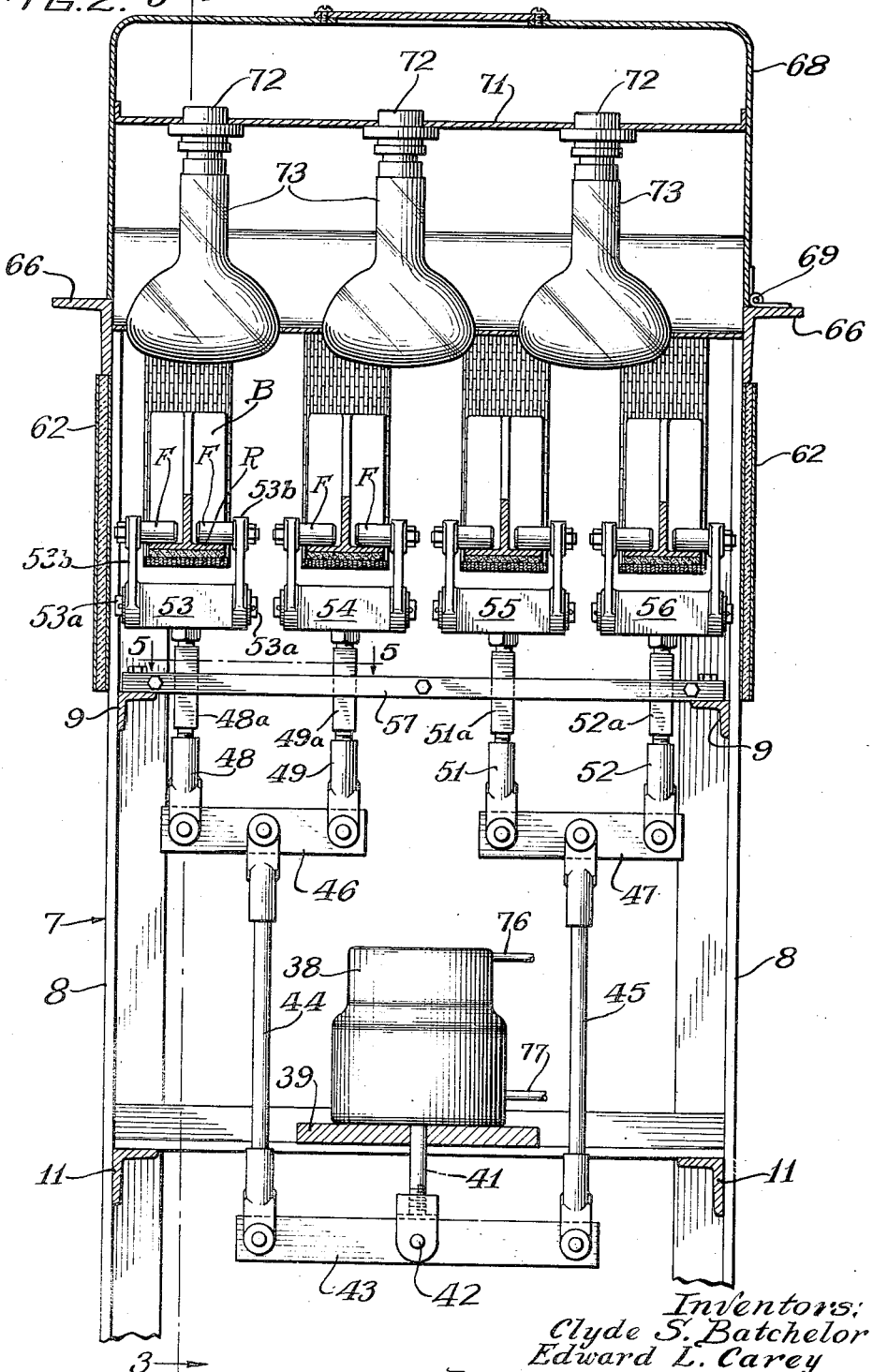
Inventors:
Clyde S. Batchelor
Edward L. Carey
By L. u J. Gary Attorney

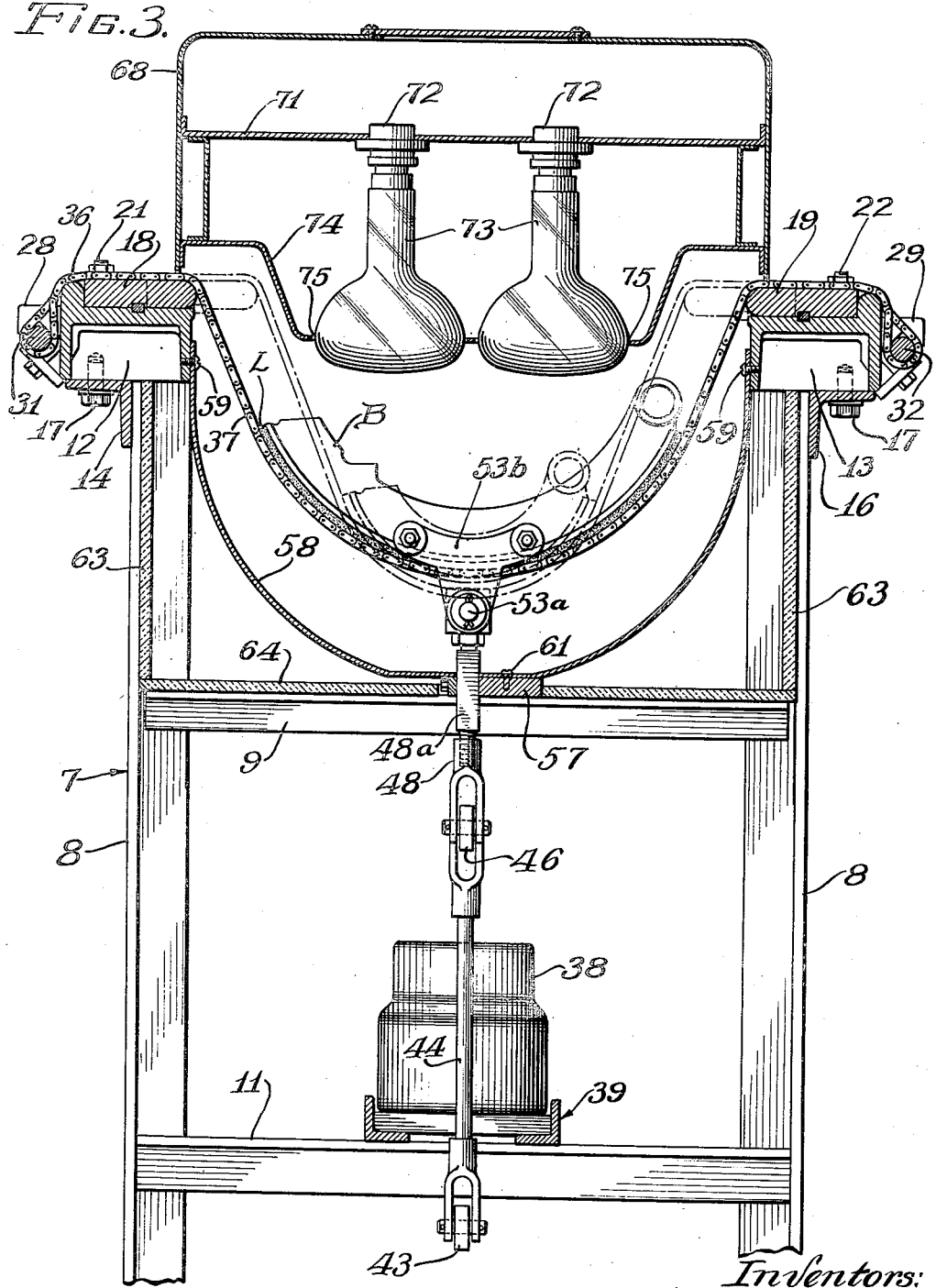

Patented July 10, 1951

2,559,748

UNITED STATES PATENT OFFICE 2,559,748

APPARATUS FOR BONDING BRAKE LININGS TO BRAKE SHOES

Clyde S. Batchelor, Upper Stepney, and Edward L. Carey, Bridgeport, Conn., assignors to Raybestos-Manhattan, Inc., Passaic, N. J., a corporation of New Jersey Application September 24, 1949, Serial No. 117,668

11 Claims. (Cl. 154—1)

This invention relates to apparatus for bonding brake linings to brake shoes and is a continuation-in-part of our copending patent application filed May 13, 1948, Serial No. 26,810, now Patent No. 2,494,281.

The present invention contemplates the provision of a relatively simple and inexpensive bonding apparatus in which an adhesively coated brake lining is adapted to be pressed into tight engagement against the mating surface of a brake shoe by means of a flexible element, such as a chain, disposed to apply a substantially uniform pressure to all portions of the lining. This result is accomplished by supporting the chain at its ends to provide a sling having optimum angle of contact with the ends of the brake lining and, more specifically, the sides of the sling are disposed tangent to the ends of the arcuate brake lining face. When the sides of the chain sling are not disposed tangent to the ends of the brake lining face, the sling cannot act to apply uniform pressure against all portions of the brake lining. For example, if the sling opening is too wide for the brake shoe and lining assembly, the point of tangency will be some distance away from the ends of the assembly and no pressure will be applied at either end of the assembly. In the event the sling opening is too small for the brake shoe and lining assembly, the chain will act to exert maximum pressure against the ends of the lining with little pressure exerted against the central or medial portion of the lining. In either event, the lack of uniform pressure against the brake shoe and lining assembly results in a defective bond which may permit the brake lining to leave the brake shoe during use on a vehicle.

This invention further contemplates the provision of a bonding apparatus adapted for use in simultaneously applying brake linings to four brake shoes. Each brake shoe and lining assembly is supported within a chain sling and a common power means is provided for exerting a uniform downward pressure against the medial portion of each brake shoe, the power means preferably comprising an air or hydraulic cylinder which acts through equalizing levers, connecting rods and pull rods for drawing the brake shoes downwardly into tight engagement against the mating surfaces of their respective brake linings.

This invention further contemplates the provision of an apparatus for bonding brake linings to brake shoes embodying means to adjust the sling opening of the flexible element to accommodate brake shoes of, for example, nine inches to sixteen inches in diameter.

This invention further contemplates the provision of a bonding apparatus embodying a plurality of infra-red lamps disposed to direct infrared rays directly against the highly heat-conductive metallic brake shoes. The heat from the infra-red rays is rapidly absorbed by the brake shoes and causes a heat-hardening type of adhesive, such as thermosetting phenolic resins, to be heated quickly. The period of time required to heat and cure a resin adhesive is dependent upon the size and weight of the brake shoe, the distance between the infra-red lamps and the brake shoes, the size of the lamps, etc. By the use of infra-red lamps, it has been found that the time for heating and curing the adhesive is considerably less than the time heretofore employed in heating and curing the resin within a bonding equipment employing a heated oven.

This invention further contemplates the provision of a bonding apparatus suitable for use in automobile service stations in relining brake shoes.

This invention embodies other novel features, details of construction and arrangement of parts which are hereinafter set forth in the specification and claims, and illustrated in the accompanying drawings, wherein:

Fig. 1 is a top plan view of the bonding device with the cover removed.

Fig. 2 is a transverse sectional view taken along the line 2—2 of Fig. 1.

Fig. 3 is a longitudinal sectional view taken along the line 3—3 of Fig. 2.

Fig. 4 is an enlarged fragmentary sectional view taken along the line 4—4 of Fig. 1.

Fig. 5 is a fragmentary detail sectional view taken along the line 5—5 of Fig. 2.

Referring now to the drawings for a better understanding of this invention, the bonding apparatus is shown as comprising a frame 7 embodying vertically disposed corner members 8, and upper and lower longitudinal members 9—9 and 11—11, respectively. The members forming the frame 7 are adapted to be welded, bolted or otherwise secured to each other to form a sturdy rigid support for the bonding apparatus mounted thereon.

A front rail 12 and a rear rail 13 are secured in spaced parallel relation upon the upper ends of the corner members 8 of the frame 7 by means of angle iron brackets 14 and 16 and cap screws 17. The angle iron brackets 14 and 16 are welded, bolted or otherwise secured to the corner members 8, and the cap screws 17 pass through apertures formed in the supporting brackets for threaded engagement into the front and rear rails 12 and 13. Adjustment plates 18 and 19 are mounted upon the upper surfaces of the front and rear rails 12 and 13, respectively, and are secured in adjusted position thereon by means of bolts 21 and 22. As illustrated more clearly in Fig. 4, each of the rails 12 and 13 is formed with a plurality of dovetail recesses 23 to receive square heads 24 of the bolts 21 and 22. By tightening the nuts 26 on the bolts 21 and 22, adjustment plates 18 and 19 are adapted to be secured in fixed position against the upper surfaces of their respective rails 12 and 13. If desired, keys 27 may be provided to prevent displacement of the adjustment plates 18 and 19 relative to their rails 12 and 13.

The front and rear rails 12 and 13 are preferably in the form of metal castings formed with outwardly extending bosses 28 and 29, respectively. Anchor pins 31 and 32 are secured against the undersides of the bosses 28 and 29, respectively, by means of plates 33 and cap screws 34. Flexible elements 36, 36a, 36b and 36c are secured at their ends to the anchor rods 31 and 32. The flexible elements are preferably in the form of link chains, as illustrated in the drawings. The medial portions of the flexible elements extend downwardly from the forward edges of the adjustment plates 18 and 19 to provide slings 37 to receive brake shoes B and brake linings L.

An air cylinder 38 is secured to a base 39 which, in turn, is secured to the longitudinal members 11 of the frame 7. A piston 41 is mounted for reciprocable movement within the cylinder 38 and has its outer end pivotally connected at 42 to the medial portion of an equalizing bar 43. A pair of connecting links 44 and 45 are pivotally connected at their lower ends to the ends of the equalizing bar 43 and have their upper ends pivotally connected to the medial portions of auxiliary equalizing bars 46 and 47. A pair of turnbuckles 48 and 49 are pivotally connected at their lower ends to the outer ends of the auxiliary equalizing bar 46. A pair of turnbuckles 51 and 52 are pivotally connected at their lower ends to the outer ends of the auxiliary equalizing bar 47. The upper ends of the turnbuckles 48, 49, 51 and 52 are provided with heads 53, 54, 55 and 56, respectively. Each head is formed with a pair of axially disposed journal portions 53a—53a, 54a—54a, 55a—55a and 56a—56a to receive its respective pair of brackets 53b—53b, 54b—54b, 55b—55b and 56b—56b. Each of the brackets 53b—53b, 54b—54b, etc. is provided with a pair of fingers F adapted to engage the rim R of a brake shoe B. The central section of each turnbuckle 48, 49, 51 and 52 is formed square at 48a, 49a, 51a and 52a, respectively, for sliding engagement within square apertures formed in a guide plate 57 which is supported at its ends upon the upper longitudinal members 9—9 of the frame 7.

A trough-shaped metal plate 58 is secured to the inner faces of the rails 12 and 13 by means of cap screws 59 and is also secured to the guide plate 57 by means of cap screws 61. The trough-shaped plate 58 is adapted to extend the full width of the machine between the corner members 8 of the frame 7 and is enclosed by means of side walls 62—62, end walls 63—63, and a bottom wall 64. If desired, the walls 62—62, 63—63 and 64 may be formed from colored plate glass to provide an attractive exterior appearance for the machine.

A pair of cover supporting members 66—66 are secured to the ends of the front and rear rails 12 and 13 by means of cap screws 67 to support a cover 68. If desired, the cover 68 may be pivotally connected to one of the supporting members 66 by means of a hinge 69. A socket-mounting plate 71 is secured within the cover 68 and is formed with apertures to receive electric lamp sockets 72 adapted to receive infra-red lamps 73. As illustrated in Figs. 2 and 3 in the drawings, the infra-red lamps 73 are adapted to extend downwardly within the loop portions 37 of the flexible elements 36, 36a, etc. to direct infra-red rays directly onto the metallic brake shoes B. A plate 74 is secured to the open end of the cover 68 and is formed with apertures 75 to receive the infra-red lamps 73. While it is contemplated that most of the infra-red rays from the lamps 73 shall be directed against the brake shoes B, some of the rays from the lamps will pass downwardly between the brake shoes and will be reflected upwardly by means of the trough-shaped plate 58. It is desirable, therefore, to form the plates 58 and 74 from polished metal to increase their light-reflecting properties.

In the operation of the bonding device, the mating surfaces of the brake shoes B and friction lining L are first coated with a heat-hardening type of adhesive, such as thermosetting phenolic resins, or modified phenolic resins, such as resin-rubber combinations. The brake shoe and lining assemblies are then positioned upon the sling portion of the flexible elements 36, 36a, 36b and 36c in the manner illustrated in the drawings. After the brake shoe and lining assemblies are positioned upon the flexible elements, it is essential that the portions of the slings extending between the adjustment plates 18 and 19 and the ends of the lining L be tangent to the arcuate surfaces at the extreme ends of the lining. In the event a brake shoe and lining assembly is too large for a sling opening 37, it will be apparent that the flexible element will exert great pressure against the ends of the lining and little pressure against the intermediate portions of the lining. If the brake shoe is too small for the sling opening, it will be apparent that the sling portion of the chain will exert pressure against the medial portion of the lining and little or no pressure against the ends of the lining. As illustrated in Fig. 3, the adjustment plates 18 and 19 are adapted to be moved toward or away from each other in order to obtain the theoretical optimum position for the portions of the sling 37 extending between the ends of the lining L and the adjustment plates 18 and 19. Of course, to move the adjustment plates to a desired position, nuts 26 are loosened and if keys 27 are employed at a predetermined position of the plates they are removed. The plates may then be moved to a desired position and secured in fixed position by tightening the nuts 26. Fig. 3 in the drawings illustrates the manner in which the upper ends of the sling portion 37 of the flexible elements should be disposed relative to the ends of the brake lining L, and further illustrates the manner in which the sling opening is varied to accommodate brake shoe and lining assemblies of different diameters.

After the brake shoe and lining assemblies have been positioned upon their respective flexible elements 36, 36a, etc., air under pressure is directed into the upper end of the air cylinder 38 through a conduit 76 to force the piston 41 downwardly. Downward movement of the piston 41 acts through the primary equalizing bar 43, connecting links 44 and 45, auxiliary equalizing bars 46 and 47, turnbuckles 48, 49, 51 and 52, brackets 53b—53b, 54b—54b, etc. to draw the fingers F downwardly against the rim portions R of the brake shoes B. It will be noted that the fingers F are disposed to engage the medial portion of the brake shoes B, and that the ends of the brake shoe and lining assemblies are equidistantly spaced from the inner edges of the adjustment plates 18 and 19. After the brake shoe and lining assemblies have been tightly engaged against their respective flexible elements, the cover 68 is moved to its closed position, as illustrated in the drawings, and the infra-red lamps 73 are connected to a source of current. The infra-red lamps are disposed as close to the brake shoe and lining assemblies as possible in order that a relatively large percentage of the infra-red rays shall be directed against the inner surfaces of the brake shoes B. The heat absorbed by the brake shoes B is rapidly transferred to the mating surfaces of the brake shoe and lining to heat and cure the adhesive. By employing infra-red lamps in the manner shown and described, it has been found that the brake linings are bonded to the brake shoes within a fraction of the time ordinarily employed in the use of heated ovens. After the linings L have been bonded to the brake shoes B, the cover 68 is pivoted to its open position and air under pressure is directed into the lower end of the air cylinder 38 through the conduit 77 to cause the piston 41 and fingers F to move upwardly.

While the bonding apparatus has been shown and described as adapted for use in bonding linings to four brake shoes, it is apparent that the apparatus may be adapted for use in bonding linings to any desired number of brake shoes by merely modifying the linkage arrangement between the air cylinder 38 and the turnbuckles 48, 49, etc.

While this invention has been shown in but one form, it is obvious to those skilled in the art that it is not so limited but is susceptible of various changes and modifications without departing from the spirit and scope of the claimed invention.

We claim as our invention:

1. In an apparatus for bonding a brake lining to a brake shoe, a pair of rails disposed in fixed spaced parallel relation, a flexible element fixedly secured at its ends to said rails and having its medial portion depending downwardly in the form of a sling to receive and support a brake lining and brake shoe assembly, and a power actuated mechanism to engage the inner face and medial portion of a brake shoe rim to tightly engage said brake lining and brake shoe assembly against the sling portion of said flexible element.

2. In an apparatus for bonding brake linings to brake shoes, a pair of stationary rails disposed in spaced parallel relation, a pair of adjustment plates mounted on the upper surfaces of their respective rails, a flexible element fixedly secured at its ends to said rails and overlying said adjustment plates, the medial portion of said flexible element depending downwardly in the form of a sling to receive and support a brake lining and brake shoe assembly, and a power actuated mechanism to engage the inner face and medial portion of a brake shoe rim to tightly engage said brake lining and brake shoe assembly against the sling portion of said flexible element.

3. In an apparatus for bonding brake linings to brake shoe, a pair of fixed rails disposed in spaced parallel relation, a pair of adjustment plates mounted on the upper surfaces of their respective rails, a flexible element fixedly secured at its ends to said rails and overlying said adjustment plates, the medial portion of said flexible element depending downwardly in the form of a sling to receive and support a brake lining and brake shoe assembly, a power actuated mechanism to engage the inner face and medial portion of a brake shoe rim to tightly engage said brake lining and brake shoe assembly against the sling portion of said flexible element, and means to adjust the positions of said adjustment plates toward or away from each other to vary the sling opening in said flexible element.

4. In an apparatus for simultaneously bonding brake linings to a pair of brake shoes, a pair of rails disposed in spaced parallel relation means for anchoring said rails in fixed position with respect to each other, a pair of flexible elements extending between and fixedly secured at their ends to said rails, the medial portion of each of said flexible elements depending downwardly in the form of a sling to receive and support a brake lining and brake shoe assembly, a pair of brackets arranged in spaced relation to engage the inner face of each brake shoe, a pull rod connected to and depending downwardly from each pair of said brackets, and means to move said pull rods downwardly to tightly engage said brake lining and brake shoe assemblies against the sling portion of their respective flexible elements.

5. In an apparatus for simultaneously bonding brake linings to a pair of brake shoe, a pair of stationary rails disposed in spaced parallel relation, a pair of flexible elements extending between and fixedly secured at their ends to said rails, the medial portion of each of said flexible elements depending downwardly in the form of a sling to receive and support a brake lining and brake shoe assembly, a pair of brackets arranged in spaced relation to engage the inner face of each brake shoe, a pull rod connected to and depending downwardly from each pair of said brackets, and common means to move said pull rods downwardly to tightly engage said brake lining and brake shoe assemblies against the sling portion of their respective flexible elements.

6. In an apparatus for simultaneously bonding brake linings to a pair of brake shoes, a pair of stationary rails disposed in spaced parallel relation, a pair of adjustment plates mounted on the upper surfaces of their respective rails, a pair of flexible elements extending between and fixedly secured at their ends to said rails, said flexible elements overlying said adjustment plates and having their medial portions depending downwardly in the form of a sling to receive and support their respective brake lining and brake shoe assemblies, a pair of brackets arranged in spaced relation to engage the inner face of each brake shoe, a pull rod connected to and depending downwardly from each pair of said brackets, and means to move said pull rods downwardly to tightly engage said brake lining and brake shoe assemblies against the sling portion of their respective flexible elements.

7. In an apparatus for simultaneously bonding brake linings to a pair of brake shoes, a pair of stationary rails disposed in spaced parallel relation, a pair of adjustment plates mounted on the upper surfaces of their respective rails, a pair of flexible elements extending between and fixedly secured at their ends to said rails, said flexible elements overlying said adjustment plates and having their medial portions depending downwardly in the form of a sling to receive and support their respective brake lining and brake shoe assemblies, a pair of brackets arranged in spaced relation to engage the inner face of each brake shoe, a pull rod connected to and depending downwardly from each pair of said brackets, and common means to move said pull rods downwardly to tightly engage said brake lining and brake shoe assemblies against the sling portion of their respective flexible elements.

8. In an apparatus for simultaneously bonding brake linings to a pair of brake shoes, a pair of rails disposed in spaced parallel relation, a pair of flexible elements extending between and secured at their ends to said rails, the medial portion of each of said flexible elements depending downwardly in the form of a sling to receive and support a brake lining and brake shoe assembly, a pair of brackets arranged in spaced relation to engage the inner face of each brake shoe, a pull rod connected to and depending downwardly from each pair of said brackets, an equalizing bar having its ends pivotally connected to the lower ends of said pull rods, a connecting rod having its upper end pivotally connected to the medial portion of said equalizing bar, and means to move said connecting rod downwardly to cause the brake lining and brake shoe assemblies to be moved into tight engagement against the sling portions of their respective flexible elements.

9. In an apparatus for simultaneously bonding brake linings to a pair of brake shoes, a pair of rails disposed in spaced parallel relation, a pair of adjustment plates mounted on the upper surfaces of their respective rails, a pair of flexible elements extending between and secured at their ends to said rails, said flexible elements overlying said adjustment plates and having their medial portions depending downwardly in the form of slings to receive and support brake lining and brake shoe assemblies, a pair of brackets arranged in spaced relation to engage the inner face of each brake shoe, a pull rod connected to and depending downwardly from each pair of said brackets, an equalizing bar having its ends pivotally connected to the lower ends of said pull rods, a connecting rod having its upper end pivotally connected to the medial portion of said equalizing bar, and means to move said connecting rod downwardly to cause the brake lining and brake shoe assemblies to be moved into tight engagement against the sling portions of their respective flexible elements.

10. In an apparatus for simultaneously bonding brake linings to four brake shoes, a pair of rails disposed in spaced parallel relation, a pair of adjustment plates mounted on the upper surfaces of their respective rails, four flexible elements extending between and secured at their ends to said rails, said flexible elements overlying said adjustment plates and having their medial portions depending downwardly in the form of slings to receive and support a brake lining and brake shoe assembly, a pair of brackets to engage the inner faces of each brake shoe, a pull rod connected to and depending downwardly from each pair of said brackets, an auxiliary equalizing bar having its ends pivotally connected to the lower ends of each adjacent pair of pull rods, a connecting rod pivotally connected to the medial portion of each equalizing bar, a primary equalizing bar pivotally connected at its ends to the lower ends of said connecting rods, a piston pivotally connected to the medial portion of said primary equalizing bar, and an air cylinder for said piston.

11. In an apparatus for tightly securing a brake lining to a brake shoe to associate them for bonding purposes comprising a rigid frame, a pair of rails disposed upon said frame, means for rigidly securing said rails to said frame in fixed spaced relationship to each other, a flexible element between and fixedly secured at its ends to said rails, the medial portion of said flexible element depending downwardly in the form of a sling to receive and support a brake lining and brake shoe assembly, means for engaging said brake shoe assembly, and means for moving said engaging means downwardly to tightly engage said brake lining and brake shoe assembly against the sling portion of the flexible element.

CLYDE S. BATCHELOR.
EDWARD L. CAREY.

REFERENCES CITED

The following references are of record in the file of this patent:

UNITED STATES PATENTS

| Number | Name | Date |
|---|---|---|
| 2,494,281 | Batchelor | Jan. 10, 1950 |